US012055671B2

United States Patent
van der Ende et al.

(10) Patent No.: US 12,055,671 B2
(45) Date of Patent: Aug. 6, 2024

(54) SYSTEM AND METHOD FOR USE IN MEASURING A PROPERTY OF AN ENVIRONMENT IN, OR ADJACENT TO, AN ELONGATED SPACE

(71) Applicant: Paradigm Technology Services B.V., Groot-Ammers (NL)

(72) Inventors: Andre Martin van der Ende, Aberdeenshire (GB); Lourens van Bruchem, Groot-Ammers (NL)

(73) Assignee: Paradigm Technology Services B.V., Groot-Ammes (NL)

( * ) Notice: Subject to any disclaimer, the term of this patent is extended or adjusted under 35 U.S.C. 154(b) by 790 days.

(21) Appl. No.: 16/614,780

(22) PCT Filed: May 18, 2018

(86) PCT No.: PCT/EP2018/063128
§ 371 (c)(1),
(2) Date: Nov. 18, 2019

(87) PCT Pub. No.: WO2018/211083
PCT Pub. Date: Nov. 22, 2018

(65) Prior Publication Data
US 2020/0183040 A1 Jun. 11, 2020

(30) Foreign Application Priority Data
May 18, 2017 (GB) ...................................... 1707957

(51) Int. Cl.
*G01V 1/40* (2006.01)
*E21B 23/00* (2006.01)
(Continued)

(52) U.S. Cl.
CPC ................ *G01V 1/40* (2013.01); *E21B 23/14* (2013.01); *G01V 11/002* (2013.01); *E21B 23/001* (2020.05)

(58) Field of Classification Search
CPC ........ G01V 1/40; G01V 11/002; E21B 23/14; E21B 23/001; E21B 23/00; E21B 47/13
(Continued)

(56) References Cited

U.S. PATENT DOCUMENTS

| 4,222,629 A * | 9/1980 | Dassele ................ G02B 6/4292 385/94 |
| 2012/0175513 A1* | 7/2012 | Duncan ................... G01T 1/201 250/269.1 |

(Continued)

FOREIGN PATENT DOCUMENTS

| CA | 2925059 A1 * | 4/2015 | ............. E21B 23/00 |
| GB | 2522211 * | 7/2015 | |

(Continued)

*Primary Examiner* — Michael P Nghiem
(74) *Attorney, Agent, or Firm* — William H. Honaker; Dickinson Wright PLLC

(57) ABSTRACT

A system comprises a tool arrangement; a line including an optical fibre for distributed optical sensing measurements, and an electrically conductive member covered by an electrically insulating material, the line having the outer profile of a slickline; and a termination-coupler which mechanically connects the line to the tool arrangement, electrically connects the electrically conductive member of the line to the tool arrangement, and optically terminates the optical fibre of the line. A method comprises using the optical fibre to perform distributed optical sensing measurements; identifying one or more regions of interest of the elongated space based at least in part on results of the distributed optical sensing measurements; hauling in and/or paying out the line to cause the tool arrangement to move to each region of interest; and electrically transmitting information along the (Continued)

electrically conductive member to cause the tool arrangement to measure the one or more values.

<div align="center">20 Claims, 7 Drawing Sheets</div>

(51) Int. Cl.
   *E21B 23/14*     (2006.01)
   *G01V 11/00*     (2006.01)
(58) Field of Classification Search
   USPC .............................................................. 702/6
   See application file for complete search history.

(56) References Cited

U.S. PATENT DOCUMENTS

| | | | |
|---|---|---|---|
| 2013/0228381 A1* | 9/2013 | Yambao | E21B 47/01 |
| | | | 175/107 |
| 2016/0215579 A1* | 7/2016 | Van Der Ende | E21B 23/14 |
| 2018/0010400 A1* | 1/2018 | Thomas | E21B 17/023 |
| 2018/0073310 A1* | 3/2018 | Varkey | E21B 17/206 |
| 2019/0369340 A1* | 12/2019 | Ramasubramanian | |
| | | | G02B 6/4472 |

FOREIGN PATENT DOCUMENTS

| | | |
|---|---|---|
| WO | 20160018343 A1 | 2/2016 |
| WO | 20120122446 A1 | 8/2016 |
| WO | 2016182784 A1 | 11/2016 |
| WO | 20160179677 A1 | 11/2016 |

* cited by examiner

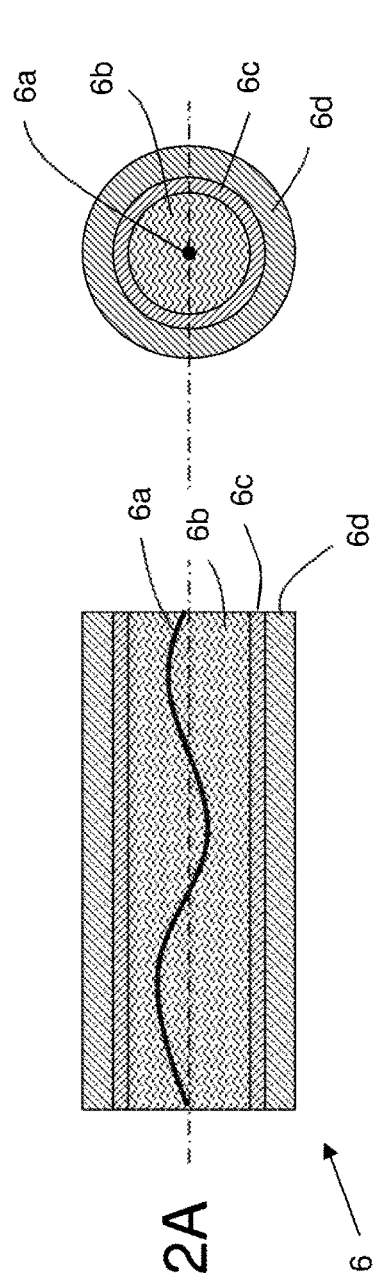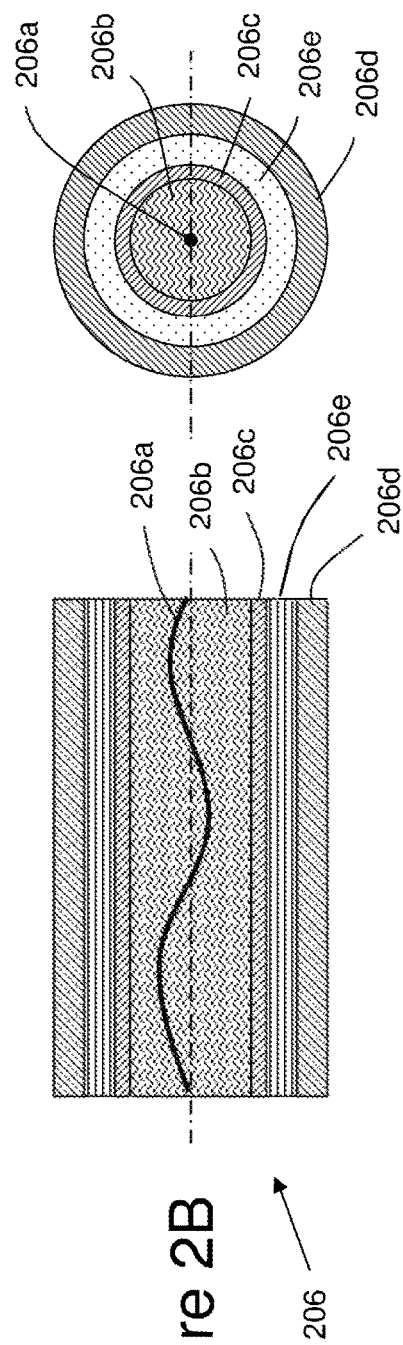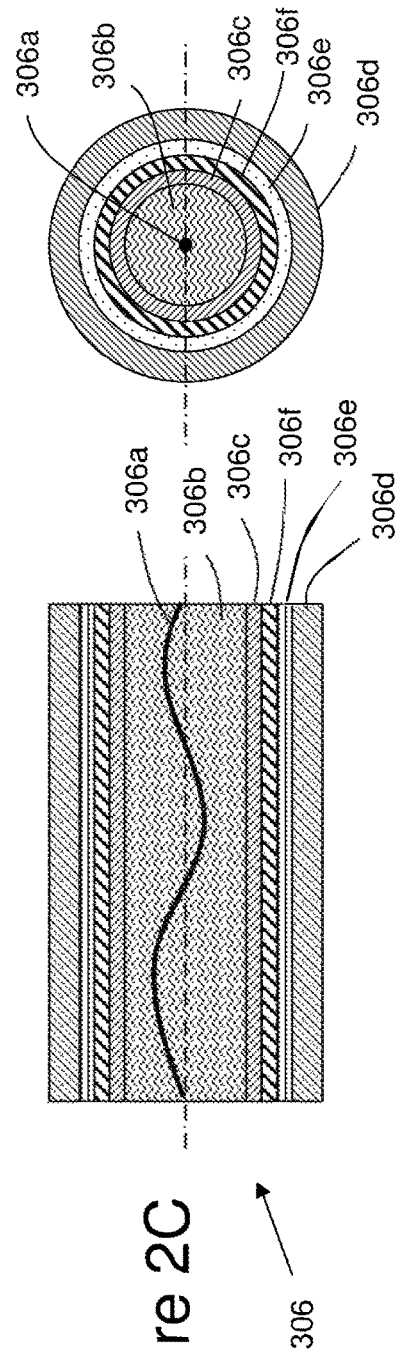

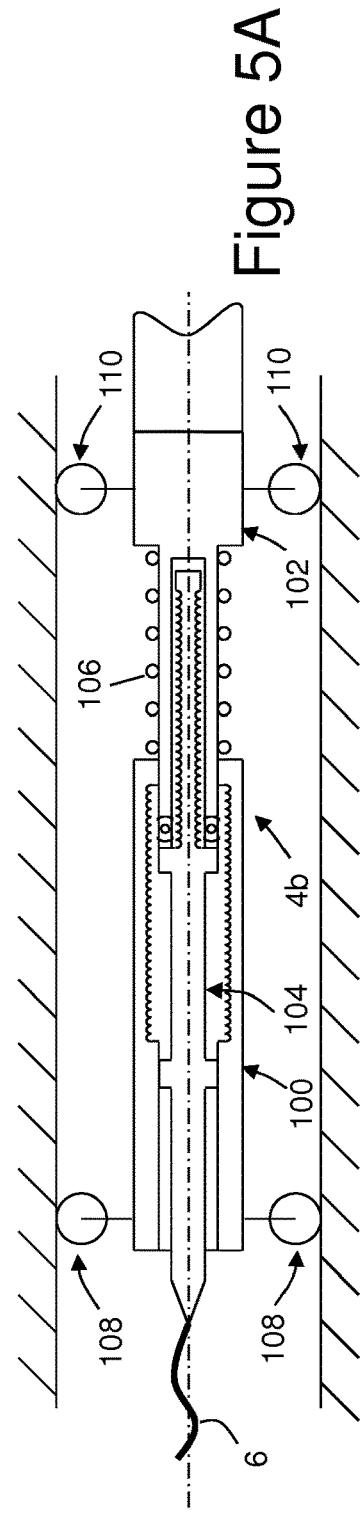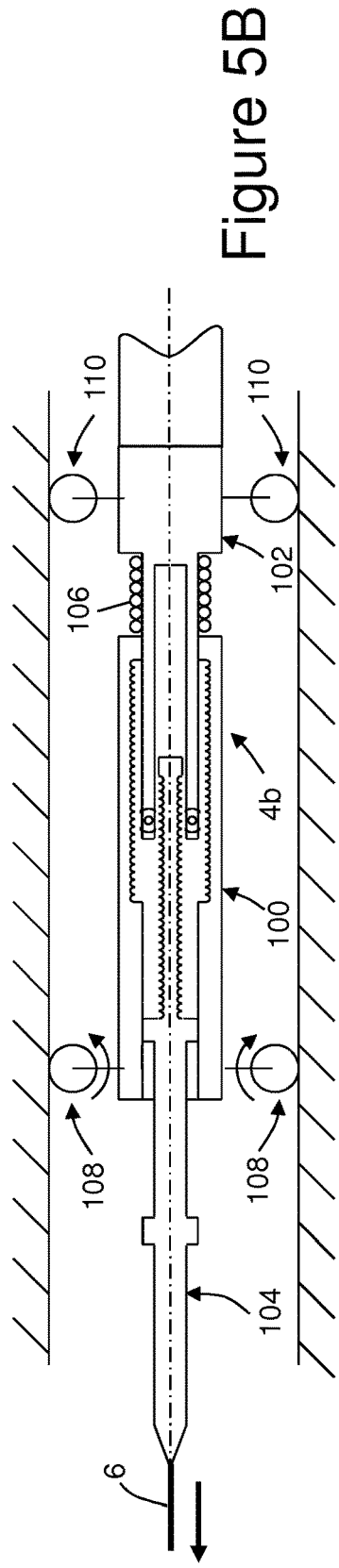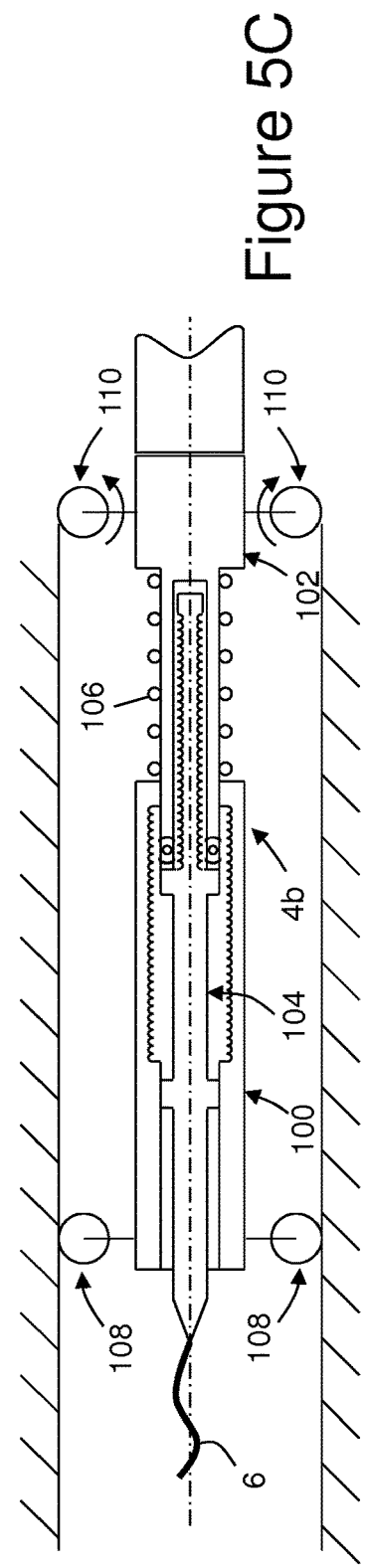

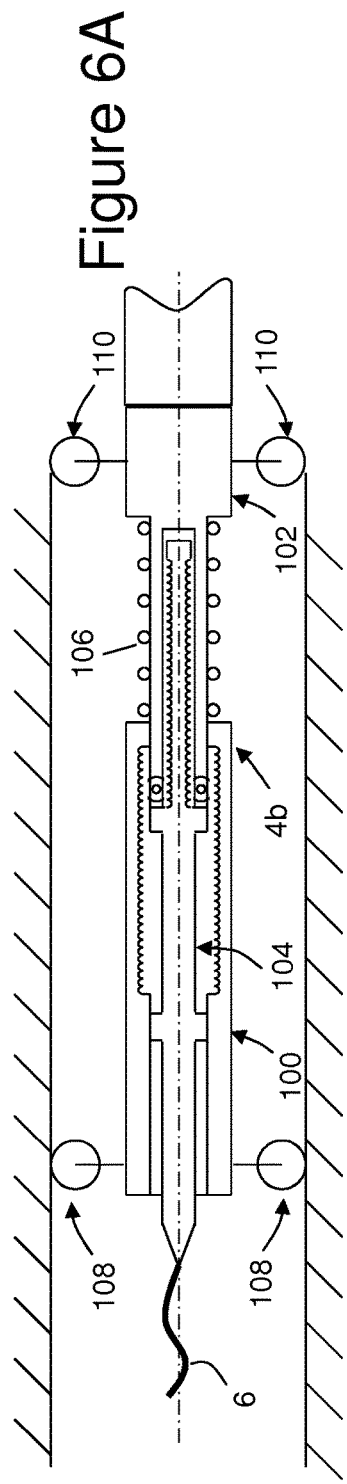
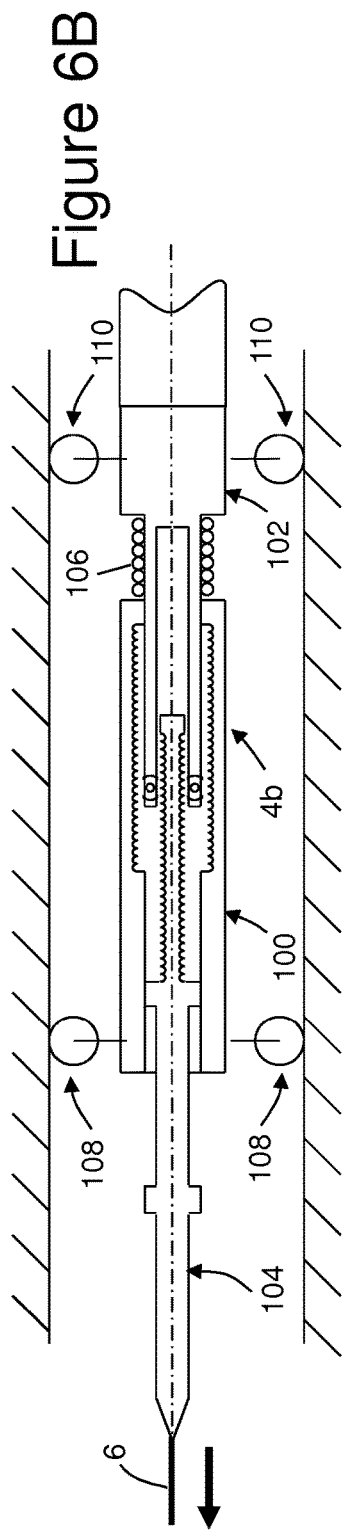
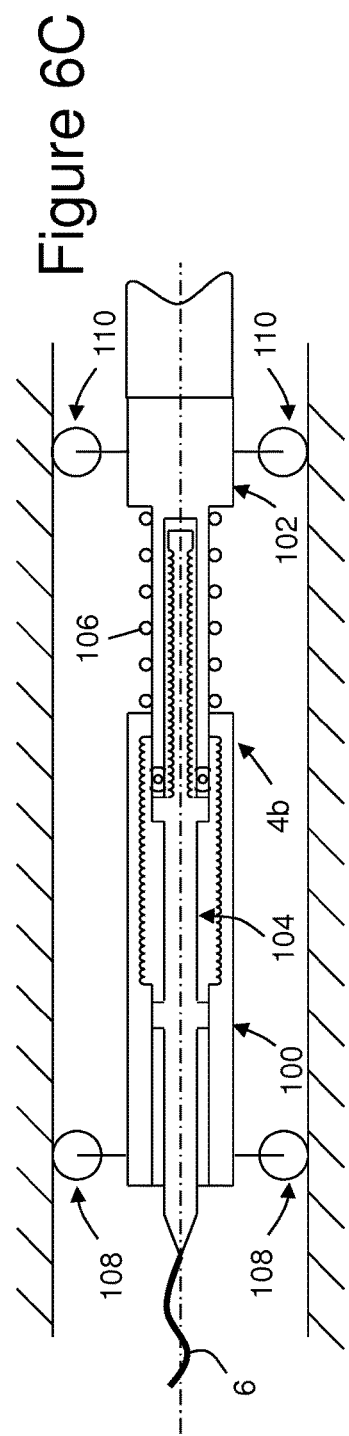

SYSTEM AND METHOD FOR USE IN MEASURING A PROPERTY OF AN ENVIRONMENT IN, OR ADJACENT TO, AN ELONGATED SPACE

CROSS-REFERENCE TO RELATED APPLICATION

This application is a 35 U.S.C. § 371 national stage application of PCT Application Ser. No. PCT/EP2018/063128, filed on May 18, 2018, which claims priority to GB Patent Application Ser. No. GB1707957.5, filed on May 18, 2017, the entire contents of which are incorporated herein by reference in its entireties.

FIELD

The present invention relates to a system and a method for use in measuring a property in, or adjacent to, an elongated space and, in particular though not exclusively, for use in measuring a property in, or adjacent to, a wellbore of an oil and gas well.

BACKGROUND

It is known to perform distributed optical sensing measurements when logging a wellbore of an oil and gas well. For example, it is known to perform Distributed Temperature Sensing (DTS) or Distributed Acoustic Sensing (DAS) measurements. Such distributed optical sensing measurements require an optical sensing fibre to be deployed in the wellbore. The optical sensing fibre is normally housed in a protective (metal) tube which is wound on a drum of a surface winch. The surface winch lowers the metal tube into the wellbore under the action of gravity. A number of weight bars may be attached to the distal end of the metal tube for this purpose. The weight bars may be equipped with rollers to reduce friction against a wall of the wellbore. In deviated wells, the friction reducing measure may not be sufficient and it may not be possible to lower the metal tube to a desired position in a deviated well.

In addition, such distributed optical sensing measurements are generally made in addition to, or in conjunction with, further measurements of parameters relating to the environment in, or adjacent to, the wellbore, which further measurements are made using one or more point sensors located in a tool string as part of the wellbore logging procedure and such conventional methods for logging a wellbore may take days or weeks and may require multiple well interventions. This may increase the associated well servicing and production costs.

It is also known to use fibre-optic slicklines comprising one or more optical fibres housed in a protective (metal) tube for optical fibre communications between a downhole tool string and a surface controller. Such downhole optical fibre communications generally employ much faster data rates than those achievable using downhole electrical communications over electrical conductors, cables or lines. However, such downhole optical fibre communications generally require more complicated, more costly downhole optoelectronic converters and require the use of more complicated, more costly downhole optical fibre connections.

SUMMARY

It should be understood that any one or more of the features of one of the following aspects or embodiments of the present invention may be used in combination with any one or more of the features of any of the other following aspects or embodiments of the present invention.

According to an aspect or an embodiment of the present invention there is provided a method for use in measuring a property of an environment in, or adjacent to, an elongated space, the method comprising:

deploying a tool arrangement into an elongated space using a line coupled to the tool arrangement, the tool arrangement being configured for measuring a property of an environment in, or adjacent to, the elongated space, the line including an optical fibre for distributed optical sensing measurements, an electrically insulating material, and an electrically conductive member covered by, or embedded in, the electrically insulating material, the line having the outer profile of a slickline, and the line being coupled to the tool arrangement via a termination-coupler which mechanically connects the line to the tool arrangement, which electrically connects the electrically conductive member of the line to the tool arrangement, and which optically terminates the optical fibre of the line;

using the optical fibre to perform distributed optical sensing measurements;

identifying one or more regions of interest of the elongated space based at least in part on results of the distributed optical sensing measurements;

hauling in and/or paying out the line so as to cause the tool arrangement to move along the elongated space to each region of interest; and electrically transmitting information along the electrically conductive member of the line so as to cause the tool arrangement to measure one or more values of a property of the environment in, or adjacent to, the elongated space in each region of interest.

The tool arrangement may comprise one or more measurement tools such as one or more industry-standard measurement tools. The tool arrangement may comprise one or more logging tools such as one or more industry-standard logging tools.

In effect, such a method may facilitate an initial distributed optical sensing survey of the elongated space to be performed using the optical fibre, one or more regions of interest to be identified at least in part on results of the distributed optical sensing measurements whilst also facilitating a more "in-depth" analysis of each region of interest based on measurements performed using the tool arrangement. The use of a termination-coupler avoids any requirement for a complicated or costly downhole optical fibre connection between the optical fibre and the one or more tools.

The distributed optical sensing measurements may comprise at least one of distributed temperature, distributed pressure, distributed strain, and distributed acoustic sensing measurements.

The tool arrangement may be configured to measure the one or more values of the property of the environment in, or adjacent to, the elongated space using a measurement technique other than the measurement technique used for the distributed optical sensing measurements.

The property of the environment in, or adjacent to, the elongated space may comprise at least one of a temperature, a pressure, a fluid flow rate, a vibration, an acoustic property, an ultrasonic property, a seismic property, an electrical property, a magnetic property, an electromagnetic property, and a measure of radiation such as a measure of gamma radiation.

The method may comprise electrically transmitting data along the electrically conductive member of the line, which data is representative of a measured value of the property of the environment in, or adjacent to, the elongated space.

The method may comprise determining a position of the tool arrangement in the elongated space. The method may comprise comparing the determined position of the tool arrangement in the elongated space with a position of each region of interest. The method may comprise determining that the tool arrangement has reached one of the regions of interest from the results of the comparison.

The method may comprise comparing the determined position of the tool arrangement in the elongated space with a target position. The method may comprise determining that the tool arrangement has reached the target position from the results of the comparison.

The method may comprise using the optical fibre to perform the distributed optical sensing measurements as the tool arrangement moves towards a target position and/or when the tool arrangement is located at a target position.

The tool arrangement may measure one or more values of the property of the environment in, or adjacent to, the elongated space as the tool arrangement moves towards a target position and/or when the tool arrangement is located at the target position.

The method may comprise analysing each value of the property of the environment in, or adjacent to, the elongated space measured as the tool arrangement moves towards the target position and/or when the tool arrangement is located at the target position. The method may comprise identifying the one or more regions of interest of the elongated space based in part upon results of the analysis of each measured value of the property of the environment in, or adjacent to, the elongated space.

The tool arrangement may comprise a tractor. The method may comprise electrically transmitting information along the electrically conductive member of the line so as to cause the tractor to propel the tool arrangement along the elongated space.

The tractor may comprise a battery-powered conventional tractor. The method may comprise sending and/or receiving control commands to and from the battery-powered tractor along the electrically conductive member so as to cause the battery-powered tractor to propel the tool arrangement along the elongated space. The method may comprise sending and/or receiving control commands to and from the battery-powered tractor along the electrically conductive member so as to cause the battery-powered tractor to propel the tool arrangement to each region of interest. The method may comprise sending and/or receiving control commands to and from the battery-powered tractor along the electrically conductive member so as to cause the battery-powered tractor to propel the tool arrangement to the target position.

The tool arrangement may comprise a mechanically-powered tractor which is configured to operate according to a reciprocating inchworm principle. The method may comprise transmitting a stroke cycle position of the mechanically-powered tractor as an electrical signal along the electrically conductive member of the line. The method may comprise reciprocating the line according to the stroke cycle position of the mechanically-powered tractor so as to cause the mechanically-powered tractor to propel the tool arrangement along the elongated space. The method may comprise reciprocating the line according to the stroke cycle position of the mechanically-powered tractor so as to cause the mechanically-powered tractor to propel the tool arrangement to each region of interest. The method may comprise reciprocating the line according to the stroke cycle position of the mechanically-powered tractor so as to cause the mechanically-powered tractor to propel the tool arrangement to the target position.

The use of a battery-powered conventional tractor or a mechanically-powered tractor may allow the tool arrangement to be deployed to a target position in the elongated space and/or a region of interest of the elongated space when the elongated space is deviated from the vertical or is horizontal and the tool arrangement cannot reach the target position under the action of gravity alone. Such a method may allow the tool arrangement to be moved along a deviated or horizontal elongated space in an efficient automated manner without any requirement for an operator to manually operate a winch to haul in and/or pay out the line. Such methods may also avoid any requirement to transmit electrical power along the line.

The tool arrangement may comprise a jar or a stroker.

The tool arrangement may comprise one or more tools for performing an operation in, or adjacent to, the elongated space. The tool arrangement may comprise a mechanical cutter.

The method may comprise electrically transmitting information along the electrically conductive member of the line to control the one or more tools to perform the operation in, or adjacent to, the elongated space.

The method may comprise measuring a property of the tool arrangement and electrically transmitting data representative of the measured property of the tool arrangement along the electrically conductive member of the line.

The measured property of the tool arrangement may comprise at least one of:
 a position, velocity and/or acceleration of the tool arrangement;
 relative positions of one or more parts of the tool arrangement;
 a power level of a battery of the tool arrangement; and
 a rate of consumption of power stored in a battery of the tool arrangement.

This may allow the status of the tool arrangement to be monitored remotely from the tool arrangement and/or remotely from the elongated space.

The method may comprise measuring a property of line in the elongated space and electrically transmitting data representative of the measured property of the line along the electrically conductive member of the line.

The method may comprise measuring a tension in line in the elongated space and electrically transmitting data representative of the measured tension in the line along the electrically conductive member of the line.

This may allow the property of the line in the elongated space to be monitored remotely from the tool arrangement and/or remotely from the elongated space.

The elongated space may be defined at least partially within or adjacent to at least one of a borehole, a wellbore, an oil or gas well, tubing, casing, a pipe, and a pipeline.

According to an aspect or an embodiment of the present invention there is provided a system for measuring a property of an environment in, or adjacent to, an elongated space, the system comprising:
 a tool arrangement for measuring a property of an environment in, or adjacent to, the elongated space;
 a line including an optical fibre for distributed optical sensing measurements, an electrically insulating material, and an electrically conductive member covered by, or embedded in, the electrically insulating material, and the line having the outer profile of a slickline;

a termination-coupler which mechanically connects the line to the tool arrangement, which electrically connects the electrically conductive member of the line to the tool arrangement, and which optically terminates the optical fibre of the line;

a winch arrangement for hauling in and/or paying out the line;

an optical sensing module configured to perform distributed optical sensing measurements using the optical fibre; and a controller configured to:
identify one or more regions of interest of the elongated space based at least in part on results of the distributed optical sensing measurements;
control the winch arrangement to haul in and/or pay out the line so as to cause the tool arrangement to move along the elongated space to each region of interest; and
electrically transmit information along the electrically conductive member of the line so as to cause the tool arrangement to measure a property of the environment in, or adjacent to, the elongated space in each region of interest.

The distributed optical sensing measurements may comprise at least one of distributed temperature, distributed pressure, distributed strain, and distributed acoustic sensing measurements.

The property of the environment in, or adjacent to, the elongated space may comprise at least one of a temperature, a pressure, a fluid flow rate, a vibration, an acoustic property, an ultrasonic property, a seismic property, an electrical property, a magnetic property, an electromagnetic property, and a measure of radiation such as a measure of gamma radiation.

The controller may be configured to cause the tool arrangement to measure a property of the tool arrangement.

The controller may be configured to cause the tool arrangement to measure a property of the line in the elongated space.

The controller may be configured to cause the tool arrangement to measure a tension in the line in the elongated space.

The tool arrangement may comprise a tractor. The tractor may be configured to propel the tool arrangement along the elongated space in response to information transmitted electrically along the electrically conductive member of the line.

The tractor may comprise a battery-powered conventional tractor.

The tractor may comprise a mechanically-powered tractor. The mechanically-powered tractor may be configured to operate according to a reciprocating inchworm principle. The mechanically-powered tractor may be configured to transmit a stroke cycle position of the mechanically-powered tractor as an electrical signal to the controller along the electrically conductive member. The controller may be configured to control the winch arrangement to haul in and pay out the line according to the stroke cycle position of the mechanically-powered tractor so as to cause the mechanically-powered tractor to propel the tool arrangement along the elongated space towards the target position.

The optical sensing module may comprise an optical source for transmitting a light signal along the optical fibre in a first direction and an optical detector for detecting a light signal travelling back along the optical fibre in a second direction opposite to the first direction.

The light signal travelling back along the optical fibre in the second direction may comprise reflected light.

The light signal travelling back along the optical fibre in the second direction may comprise back-scattered light such as elastic and/or inelastic back-scattered light.

The tool arrangement may comprise one or more tools for measuring one or more values of the property of the environment in, or adjacent to, the elongated space.

The termination-coupler may mechanically couple the line to the one or more tools. The termination-coupler may electrically couple the electrically conductive member to the one or more tools. The termination-coupler may optically terminate the optical fibre without optically coupling the optical fibre to the one or more tools. Such a system may avoid any requirement for a complicated or costly downhole optical fibre connection between the optical fibre and the one or more tools.

The tractor may be mechanically and electrically coupled to the one or more tools.

The termination-coupler may mechanically couple the line to the tractor. The termination-coupler may electrically couple the conductive member to the tractor. The termination-coupler may optically terminate the optical fibre without optically coupling the optical fibre to the tractor.

The termination-coupler may comprise a termination housing defining a sealed chamber. The sealed chamber may contain a distal end of the optical fibre. The sealed chamber may contain gel.

The distal end of the optical fibre may be configured to reflect at least a portion of incident light transmitted along the optical fibre in a first direction back along the optical fibre in a second direction opposite to the first direction.

The distal end of the optical fibre may be polished, cleaved or otherwise terminated to reflect at least a portion of the incident light.

The termination-coupler may comprise a reflector optically coupled to the distal end of the optical fibre so as to reflect at least a portion of incident light transmitted along the optical fibre in a first direction back along the optical fibre in a second direction opposite to the first direction.

The reflector may be a specular reflector or may be optically smooth. The reflector may comprise a mirror. The reflector may comprise an interface between dielectric materials.

The reflector may be a non-specular reflector. The reflector may be optically rough. The reflector may be configured to backscatter at least a portion of the incident light.

The line may have an outer diameter of 0.092", 0.108", 0.125", 0.140", 0.150", 0.160" or 0.20".

The line may have an outer diameter of 2 to 15 mm, 3 to 10 mm or 4 to 8 mm.

The line may comprise a tubular member. The optical fibre may be contained within the tubular member.

The line may comprise gel within the tubular member and the optical fibre may be embedded within the gel.

The tubular member may comprise or be formed from an electrically conductive material so as to define the electrically conductive member.

The tubular member may comprise one or more metals.

The tubular member may comprise or be formed from one or more alloys.

The tubular member may comprise or be formed from an austenitic alloy.

The electrically conductive member may be located outside the tubular member.

The electrically conductive member may comprise an electrically conductive coating, an electrically conductive sheathing layer or an electrically conductive braid located on or around an outer surface of the tubular member. The electrically conductive member may comprise a copper braid located on or around an outer surface of the tubular member.

The tubular member may comprise or be formed from an electrically insulating material.

The tubular member may comprise or be formed from a polymer material.

The polymer material may comprise at least one of polyether ether ketone (PEEK), polyetherketoneketone (PEKK), polyaryletherketone (PAEK) and polyethylenimine (PEI).

The line may comprise a composite material located on or around the tubular member.

The composite material may be electrically insulating.

The electrically conductive member may be embedded in, or covered by, the composite material.

The composite material may comprises one or more reinforcing elements embedded in a matrix material such as a polymer material.

One or more of the reinforcing elements may comprise at least one of a glass, basalt, carbon, graphene, PBO and a ceramic material. One or more of the reinforcing elements may be of a short type, a long type or a continuous type.

The polymer material may comprise at least one of PEEK, PEKK, PAEK and PEI.

The composite material may be electrically conductive.

The composite material may comprise one or more electrically conductive reinforcing elements embedded in an electrically insulating matrix material such as an electrically insulating polymer material.

The composite material may define the electrically conductive member.

The line may comprise an electrically insulating outer coating such as a polymer outer coating.

The outer coating may be resistant to abrasion and/or corrosion.

The outer coating may comprise at least one of PEEK, PEKK, PAEK, PEI, polyether sulfone (PES) and a liquid-crystal polymer (LCP).

The line may be capable of supporting a tensile load of 200 to 2,500 kg, 300 to 1,800 kg or 400 to 1,250 kg.

The elongated space may be defined at least partially within or adjacent to at least one of a borehole, a wellbore, an oil or gas well, tubing, casing, a pipe, and a pipeline.

According to an aspect or an embodiment of the present invention there is provided a termination-coupler for a system for use in measuring a property of an environment in, or adjacent to, an elongated space, the termination-coupler being configured to mechanically connect a line to a tool arrangement, to electrically connect an electrically conductive member of the line to the tool arrangement, and to optically terminate an optical fibre of the line, and wherein the tool arrangement is configured to measure a property of an environment in, or adjacent to, the elongated space.

The termination-coupler may be configured to mechanically couple the line to one or more tools of the tool arrangement, to electrically couple the electrically conductive member of the line to the one or more tools, and to optically terminate the optical fibre without optically coupling the optical fibre to the one or more tools.

The termination-coupler may be configured to mechanically couple the line to a tractor, electrically couple the electrically conductive member to the tractor, and to optically terminate the optical fibre without optically coupling the optical fibre to the tractor.

The termination-coupler may comprise a termination housing defining a sealed chamber.

The sealed chamber may contain a distal end of the optical fibre.

The sealed chamber may contain gel.

The distal end of the optical fibre may be configured to reflect at least a portion of incident light transmitted along the optical fibre in a first direction back along the optical fibre in a second direction opposite to the first direction.

The distal end of the optical fibre may be polished, cleaved or otherwise terminated to reflect at least a portion of the incident light.

The termination-coupler may comprise a reflector optically coupled to the distal end of the optical fibre so as to reflect at least a portion of incident light transmitted along the optical fibre in a first direction back along the optical fibre in a second direction opposite to the first direction.

The elongated space may be defined at least partially within or adjacent to at least one of a borehole, a wellbore, an oil or gas well, tubing, casing, a pipe, and a pipeline.

BRIEF DESCRIPTION OF THE DRAWINGS

The present invention will now be described by way of non-limiting example only with reference to the following figures of which:

FIG. 2A shows schematic longitudinal and transverse cross-sections of a line for use in the system of FIG. 1;

FIG. 2B shows schematic longitudinal and transverse cross-sections of a first alternative line for use in the system of FIG. 1;

FIG. 2C shows schematic longitudinal and transverse cross-sections of a second alternative line for use in the system of FIG. 1;

FIG. 5(a) shows the tractor of FIG. 4 during movement in a downhole direction at the beginning of a stroke cycle before application of tension to the line when a resilient member of the tractor is in an axially extended configuration;

FIG. 5(b) shows the tractor of FIG. 5(a) after application of tension to the line so as to axially compress the resilient member;

FIG. 5(c) shows the tractor of FIG. 5(b) after release of tension in the line and axial extension of the resilient member;

FIG. 6(a) shows the tractor of FIG. 4 during movement in an uphole direction at the beginning of a stroke cycle before application of tension to the line when a resilient member of the tractor is in an axially extended configuration;

FIG. 6(b) shows the tractor of FIG. 6(a) after application of tension to the line so as to axially compress the resilient member;

FIG. 6(c) shows the tractor of FIG. 6(b) after release of tension in the line and axial extension of the resilient member.

DETAILED DESCRIPTION OF THE DRAWINGS

One skilled in the art will understand that the terms "uphole" and "downhole" are used throughout the description for ease of illustration only, but are not intended to be limiting. The term "uphole" refers to a direction along a wellbore towards a point of entry of the wellbore into a surface such as the ground or the seabed, whilst the term "downhole" refers to a direction along the wellbore away from the point of entry. As such, when a wellbore is deviated from the vertical, such terms may refer to directions which differ significantly from a vertical direction and may even refer to horizontal directions. Similarly, the term "proximate" refers to a position closer to the point of entry, and the term "distal" refers to a position further away from the point of entry.

Figure 1:
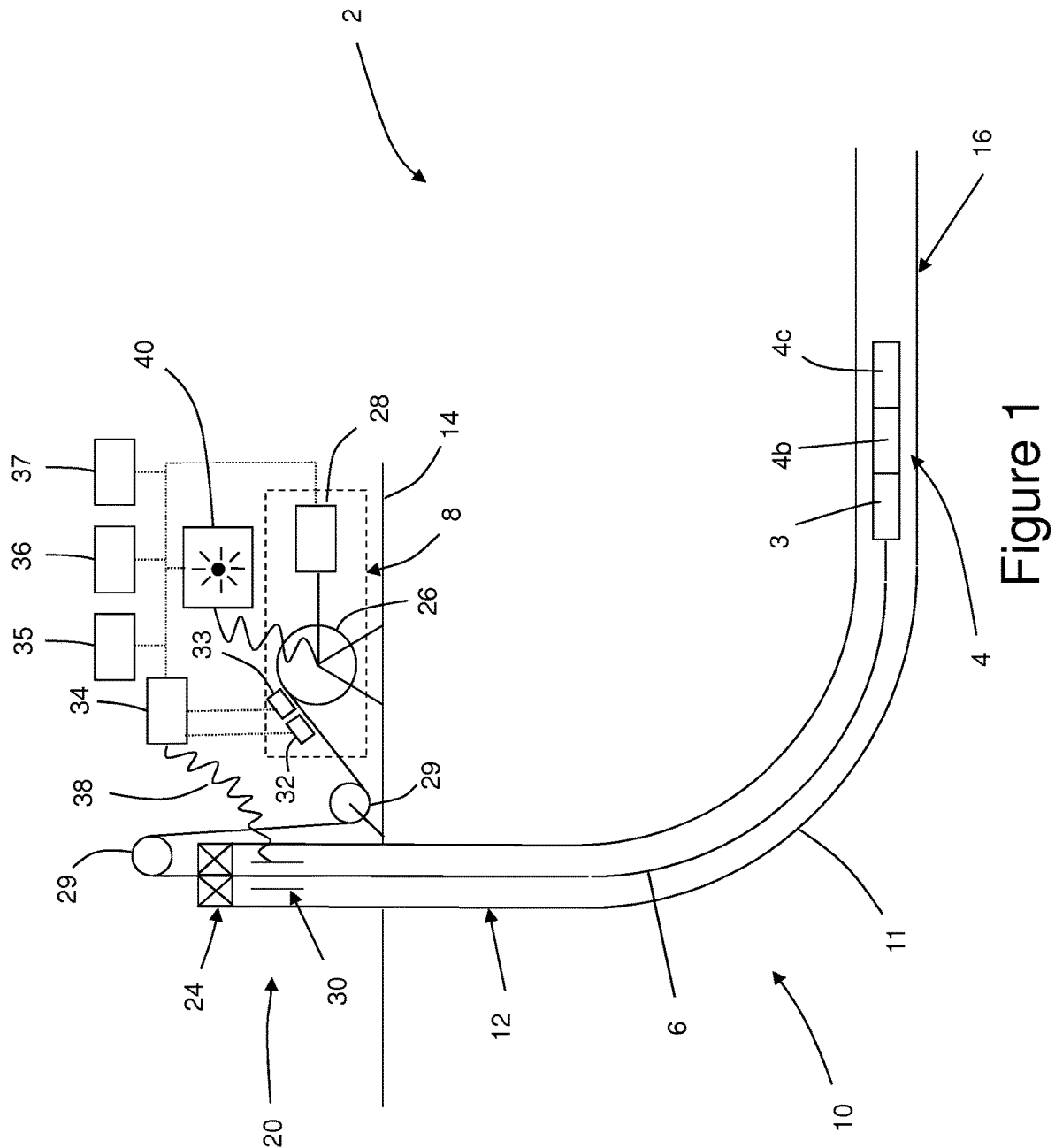
FIG. 1 is a schematic of a system for performing an operation in, or adjacent to, an elongated space in the form of a wellbore of a deviated oil and gas well.

Referring initially to FIG. 1 there is shown a system generally designated 2 in use performing an operation in, or adjacent to, an elongated space in the form of a wellbore 10 of a deviated oil and gas well. As shown in FIG. 1, the wellbore 10 may be deviated such that it has a vertical section 12 extending from a surface 14 and a horizontal section 16 extending from a heel 11 of the wellbore 10. It should be understood that the wellbore 10 may be lined with a casing or the like along at least part of its length and/or may be an open borehole along at least part of its length. It should also be understood that the surface 14 may represent ground level or the seabed.

The system 2 includes a tool arrangement generally designated 4 and a line 6 attached to the tool arrangement 4. The tool arrangement 4 includes a mechanically-powered tractor 4b and a tool string 4c including one or more tools (not shown explicitly). The tool arrangement 4 is coupled to the line 6 by a termination-coupler 3. The one or more tools of the tool string 4c may be configured to measure one or more of the properties of the environment in, or adjacent to, the wellbore 10 using a measurement technique other than the measurement technique used for the distributed optical sensing measurements. For example, each of the one or more tools of the tool string 4c may be an industry-standard logging tool which is configured to measure a localised value of one or more of the properties of the environment in, or adjacent to, the wellbore 10. For example, the one or more tools of the tool string 4c may be configured to measure at least one of a temperature, a pressure, a fluid flow rate, a vibration, an acoustic property, an ultrasonic property, a seismic property, an electrical property, a magnetic property, an electromagnetic property, and a measure of radiation such as a measure of gamma radiation.

The system 2 further includes a winch arrangement generally designated 8 located above the surface 14 in general proximity to a wellhead arrangement 20 mounted at a head of the wellbore 10. The winch arrangement 8 is configured to pay out and/or haul in the line 6.

The wellhead arrangement 20 includes a stuffing box and lubricator arrangement 24 which permits movement of the line 6 in and out of the wellbore 10, whilst also sealing the wellbore 10 from an external environment above the surface 14. The winch arrangement 8 includes a drum 26 for the slickline 6, a motor 28 for rotating the drum 26 in either direction, a winch tension sensor 32 for sensing tension in the line 6 adjacent to or in the vicinity of the winch arrangement 8, and a sensor 33 for measuring a length of line 6 hauled in and/or paid out by the winch arrangement 8 for the determination of position of the tool arrangement 4 in the wellbore 10. The line 6 extends from the drum 26 around sheave wheels 29 and passes through the stuffing box and lubricator arrangement 24 to the tool arrangement 4.

As shown in FIG. 2A, the line 6 includes an optical fibre 6a, embedded in gel 6b which is contained within an electrically conductive member in the form of a tubular metallic member 6c. The line 6 further includes an electrically insulating, abrasion- and corrosion-resistant outer coating or layer 6d which may be formed from or include a polymer material selected from at least one of PEEK, PEKK, PAEK, PEI, PES and LCP. The line 6 has the outer profile of a slickline. Specifically, the line 6 has an outer diameter selected from the outer diameters of an industry standard slickline. For example, the line 6 may have an outer diameter of 0.092", 0.108", 0.125", 0.140", 0.150", 0.160" or 0.20". The line 6 may have an outer diameter of 2 to 15 mm, 3 to 10 mm or 4 to 8 mm. The line 6 may be capable of supporting a tensile load of 200 to 2,500 kg, 300 to 1,800 kg or 400 to 1,250 kg.

Referring back to FIG. 1, the system 2 includes a tubular electrically conductive sensor element 30 mounted around the line 6 within the wellhead arrangement 20. The system 2 further includes surface controller 34, an operator input device in the form of a keyboard 35, an operator output device in the form of a display 36 and a memory or data storage 37. The sensor element 30 is electrically connected to the surface controller 34 by a cable 38. The sensor element 30 is located in sufficient proximity to the outer electrically insulating layer 6d of the line 6 so that a bound electric field associated with an electrical signal travelling along the tubular metallic member 6c of the line 6 extends and is coupled to the sensor element 30.

The system 2 further includes an optical sensing module 40 which is optically coupled to a proximate end of the optical fibre 6a. One of ordinary skill in the art will understsand that the optical sensing module 40 includes an optical source (not shown) which is optically coupled to the proximate end of the optical fibre 6a for transmitting light along the optical fibre 6a towards the tool arrangement 4 and an optical detector (not shown) which is optically coupled to the proximate end of the optical fibre 6a for receiving light reflected or backscattered along the optical fibre 6a towards the optical sensing module 40. In addition, the optical sensing module 40 includes a processor (not shown explicitly) for analysing one or more properties of the light transmitted into the optical fibre 6a and/or one or more properties of the light reflected or backscattered along the optical fibre 6a and for deriving distributed values of one or more parameters relating to the environment in, or adjacent to, the wellbore 10 to which the optical fibre 6a is exposed according to known distributed optical sensing techniques such as known distributed temperature sensing or known distributed acoustic sensing techniques. The optical sensing module 40 is mounted on, with, or inside the drum 26 of the winch arrangement 8 so that the optical sensing module 40 rotates with the drum 26. As indicated by the dotted lines in FIG. 1, the surface controller 34 is configured for communication with the motor 28, the tension sensor 32, the sensor 33 for measuring a length of line 6 hauled in and/or paid out by the winch arrangement 8, the keyboard 35, the display 36, the memory or data storage 37, and the optical sensing module 40. The system 2 may include a slip ring arrangement (not shown) at the drum 26 of the winch arrangement 8 to permit electrical communication between the surface controller 34 and the optical sensing module 40. Additionally or alternatively, the surface controller 34 and the optical sensing module 40 may be configured for wireless communication.

Figure 3:
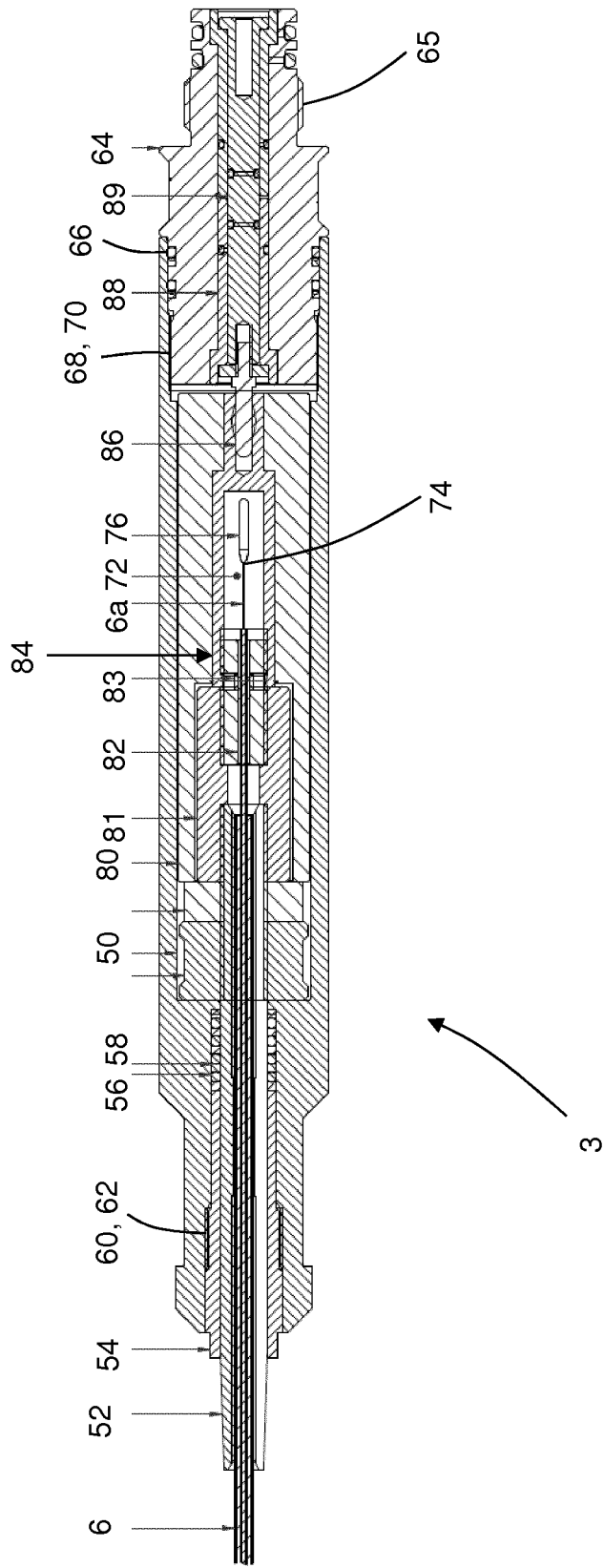
FIG. 3 is a longitudinal cross-section of a termination-coupler for use in the system of FIG. 1.

As shown in FIG. 3, the termination-coupler 3 includes a main housing 50. The termination-coupler 3 further includes a pressure seal 52, a pressure seal bushing 54, one or more O-ring seals 56 and one or more backing support rings 58. The pressure seal bushing 54 includes a male threaded section 60 which is screw coupled to a female threaded section 62 defined on an internal diameter of the main housing 50 so as to radially compress the pressure seal 52 onto the outer surface of the line 6 and so as to axially compress the one or more O-rings 56 and the one or more backing support rings 58 against a shoulder 64 defined by the main housing 50. It should be understood that the pressure seal 52 is compressed in this way so as to grip the outer surface of line 6 and thereby provide mechanical coupling between the main body and the line 6.

The termination-coupler 3 further includes a bottom housing 64 which defines a male threaded section 65 for mechanically coupling the termination-coupler 3 to the tractor 4b. An outer diameter of the bottom housing 64 carries O-ring seals 66 and defines a male threaded section 68 which is screw coupled to a female threaded section 70 defined on an internal diameter of the main housing 50 so as to compress the O-ring seals 66.

The main housing 50 and the seals 52, 56 and 66 together define a sealed chamber generally designated 72 which contains a distal end 74 of the optical fibre 6a and a mirror 76 for reflecting light emerging from the distal end 74 of the optical fibre 6a back along the optical fibre 6a. The sealed chamber 72 may be filled with gel.

The termination-coupler 3 further includes several additional features which together define electrically conductive path for electrically coupling the tubular metallic member 6c of the line 6 to the tractor 4b. Specifically, the termination coupler 3 includes first and second electrically insulating bushings 80, 81, an electrical contact sleeve 82, a contact set screw 83, an electrical contact bushing 84, an electrical contact plug 86, an electrically insulating sleeve 88 and an electrical contact rod 89 for electrically coupling the tubular metallic member 6c of the line 6 to the tractor 4b.

Figure 4:
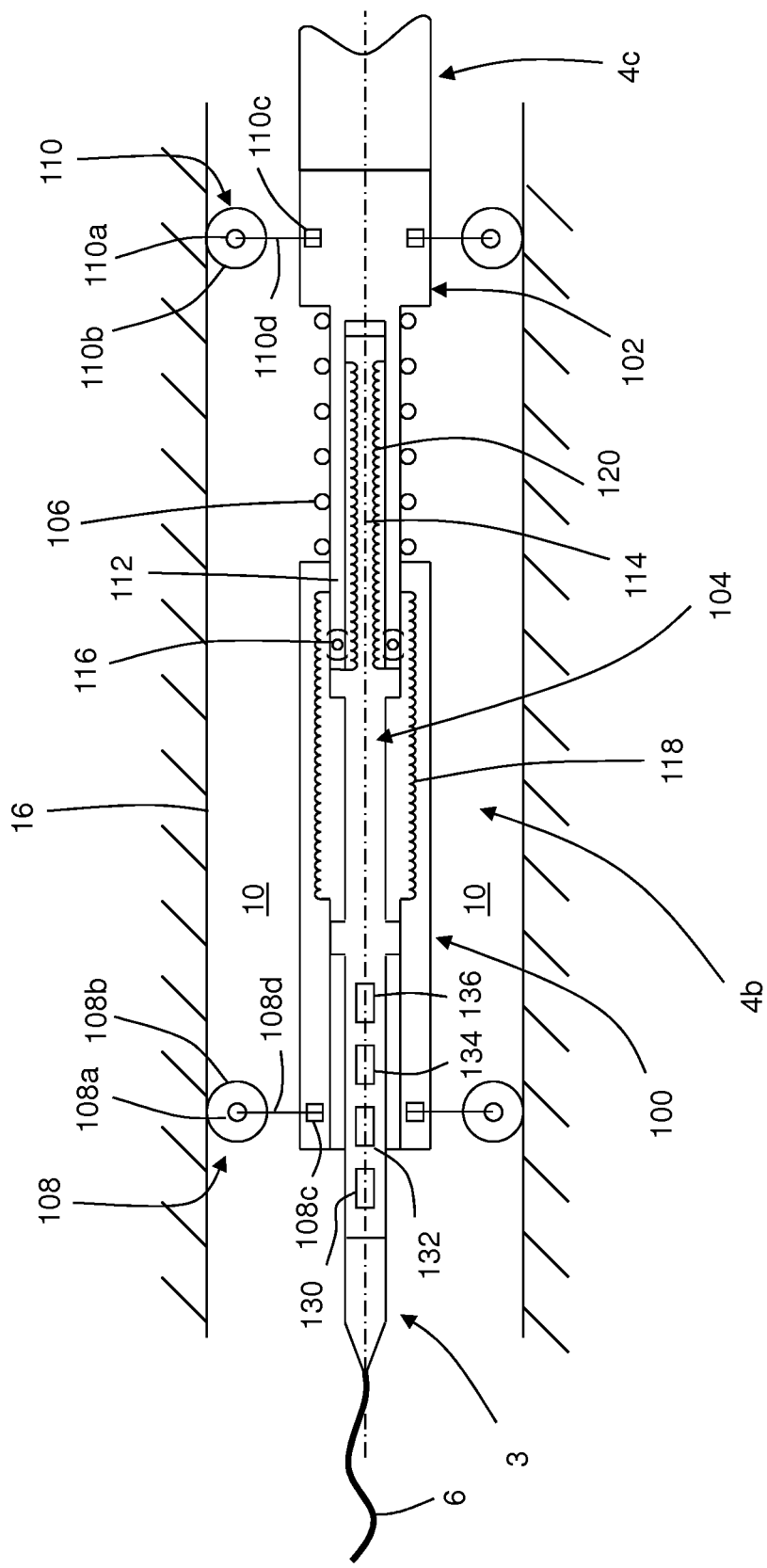
FIG. 4 is a schematic longitudinal cross-section of a mechanically-powered tractor for use in the system of FIG. 1.

The mechanically-powered tractor 4b is shown in detail in FIG. 4. One of ordinary skill in the art will immediately recognise that the mechanically-powered tractor 4b is configured to operate according to a reciprocating inchworm principle as described in more detail below.

The tractor 4b includes a first body in the form of a proximate body 100, a second body in the form of a distal body 102, an actuator member 104 and a resilient member in the form of a compression spring 106 which acts between the proximate body 100 and the distal body 102. The tractor 4b further includes a plurality of proximate rolling bodies in the form of a plurality of proximate sprag wheels 108 attached to and arranged around the proximate body 100 and a plurality of distal rolling bodies in the form of a plurality of distal sprag wheels 110 attached to and arranged around the distal body 102.

Each sprag wheel 108, 110 includes an inner axle 108a, 110a and an outer sleeve 108b, 110b which is configured to engage the surface of the wellbore 10 and which is rotatable relative to the inner axle 108a, 110a in a single direction. Although not shown explicitly in FIG. 4, one skilled in the art will appreciate that each sprag wheel 108, 110 comprises an internal bearing arrangement which includes a plurality of caged sprag elements located between the respective inner axles 108a, 110a and outer sleeves 108b, 110b. The sprag elements (not shown) are configured to allow rotation of the outer sleeves 108b, 110b relative to the inner axles 108a, 110a in a first direction, but to prevent rotation of the outer sleeves 108b, 110b relative to the inner axles 108a, 110a in a second direction opposite to the first direction. In effect, this means that each sprag wheel 108, 110 may be permitted to rotate in a first sense to permit rolling of the sprag wheel 108, 110 along the surface of the wellbore 10 for movement of the corresponding body 100, 102 along the wellbore 10 in a first direction, but may be prevented from rotating in a second sense opposite to the first sense to prevent rolling of the sprag wheel 108, 110 along the surface of the wellbore 10 for movement of the corresponding body 100, 102 along the wellbore 10 in a second direction opposite to the first direction.

The proximate and distal bodies 100, 102 each include rotary solenoids 108c, 110c which are operable to rotate respective wheel support members 108d, 110d through 180° about respective radially aligned axes. In effect, this means that each sprag wheel 108, 110 may be permitted to rotate in the second sense to permit rolling of the sprag wheel 108, 110 along the surface of the wellbore 10 for movement of the corresponding body 100, 102 along the wellbore 10 in the second direction, but may be prevented from rotating in the first sense to prevent rolling of the sprag wheel 108, 110 along the surface of the wellbore 10 for movement of the corresponding body 100, 102 along the wellbore 10 in the first direction.

The distal body 102 includes a tubular end portion 112 and the actuator member 104 includes a rod end portion 114 which is configured to reciprocate within the tubular end portion 112 of the distal body 102. Pinions 116 are mounted on the tubular end portion 112 of the distal body 102 and engage a rack portion 118 defined on an inner surface of proximate body 100 and a rack portion 120 defined on an outer surface of the rod end portion 114 of the actuator member 104.

The actuator member 104 includes a line tension sensor 130 for sensing tension in the line 6 adjacent to or in the vicinity of the tractor 4b, a tractor controller 132, a relative position sensor 134, and a battery 136.

The tractor controller 132 is electrically connected to the tubular metallic member 6c of the line 6 via the termination-coupler 3 and is configured to transmit an electrical signal to, or receive an electrical signal from, the tubular metallic member 6c. The tractor controller 132 is configured for communication with the line tension sensor 130, the relative position sensor 134, the battery 136 and the rotary solenoids 108c, 110c. For example, the tractor controller 132 may be connected to at least one of the line tension sensor 130, the relative position sensor 134, the battery 136 and the rotary solenoids 108c, 110c via cabling (not shown). The cabling (not shown) may be arranged so as to avoid restricting the relative movements between the actuator member 104 and the proximate and distal bodies 100, 102. The tractor controller 132 is configured to determine a status of the battery 136 including the quantity of electrical energy stored in the battery 136 and the rate of consumption of the electrical energy stored in the battery 136.

The battery 136 is electrically connected to the line tension sensor 130, the tractor controller 132, the relative position sensor 134 and the rotary solenoids 108c, 110c via cabling (not shown) for the provision of electrical power thereto. The cabling (not shown) may be arranged so as to avoid restricting the relative movements between the actuator member 104 and the proximate and distal bodies 100, 102.

The relative position sensor 134 is configured to sense the position of the actuator member 104 relative to the distal and/or proximate bodies 100, 102. For example, the relative position sensor 134 may be configured to detect when the actuator member 104 reaches an end-of-stroke position as discussed in more detail below. The relative position sensor 134 may be a conventional capacitive or magnetic displacement sensor 134 or any other kind of relative position sensor 134. The tractor controller 132 is configured to receive a signal from the relative position sensor 134 representative of the position of the actuator member 104 relative to the distal and/or proximate bodies 100, 102 and to determine the relative positions of the distal and proximate bodies 100, 102 from the sensed signal received from the relative position sensor 134. In other words, the tractor controller 132 is configured to determine where the tractor 4b is in its stroke cycle from the sensed signal received from the relative position sensor 134 i.e. the tractor controller 132 is configured to determine the stroke cycle position of the tractor 4b.

In use and, with reference to FIG. 1, the tool arrangement 4 is suspended by the line 6 and lowered into the vertical section 12 of the wellbore 10 by the winch arrangement 8 under the action of gravity towards a target position. As the tool arrangement 4 is lowered into the vertical section 12 of the wellbore 10, the surface controller 34 monitors the position of the tool arrangement 4 in the wellbore 10 from readings taken using the tension sensor 32 and the sensor 33 for measuring the length of line 6 hauled in and/or paid out by the winch arrangement 8 using known techniques and compares the position of the tool arrangement 4 to the target position. Additionally or alternatively, the one or more tools of the tool string 4c may be configured to measure a position of the tool arrangement 4 and the method may comprise sending the measured position of the tool arrangement 4 as an electrical signal along the tubular metallic member 6c of the line 6 to the surface controller 34 which compares the measured position of the tool arrangement 4 to the target position.

When the tool arrangement 4 reaches a position around the heel 11 of the wellbore 10 at the beginning of the horizontal section 16 of the wellbore 10, gravity can no longer act on the tool arrangement 4 to advance it further downhole. Paying out more of the line 6 then results in a reduction in line tension which is detected by the tension sensor 32 and the surface controller 34 determines that the tool arrangement 4 is stationary. As described with reference to FIGS. 5(a) to 5(c), the tractor 4b may then be operated so as to automatically advance the tractor 4b according to a reciprocating inchworm principle and thereby automatically pull and/or push the tool string 4c connected to the tractor 4b along the horizontal section 16 of the wellbore 10 to a target position in the horizontal section 16 of the wellbore 10. It should be understood that in FIGS. 5(a) to 5(c), the sprag wheels 108, 110 are configured so as to permit rolling of the sprag wheels 108, 110 relative to the surface of the wellbore 10 in the downhole direction (i.e. towards the right in FIGS. 5(a) to 5(c)) and so as to prevent rolling of the sprag wheels 108, 110 relative to the surface of the wellbore 10 in the uphole direction (i.e. towards the left in FIGS. 5(a) to 5(c)).

FIG. 5(a) shows the tractor 4b in an initial state when the line 6 is slack or under a lower level of tension, the actuator member 104 is in a fully retracted position within the proximate and distal bodies 100, 102, and the compression spring 106 is in its fully extended state. The relative position sensor 134 transmits a signal to the tractor controller 132 to indicate that the actuator member 104 has reached its fully retracted position. The tractor controller 132 transmits an appropriate electrical signal along the tubular metallic member 6c of the line 6 to the surface controller 34 via the sensor element 30 and the cable 38 to indicate that the actuator member 104 has reached its fully retracted position. In response to receipt of the electrical signal, the surface controller 34 operates the motor 28 of the winch arrangement 8 so as to apply tension to, or to increase the tension applied to, the line 6. The surface controller 34 monitors the tension applied to the line 6 via the tension sensor 32 for this purpose. The application of tension to, or the increase in tension applied to the line 6, acts to withdraw the actuator member 104 from within the proximate and distal bodies 100, 102. Since the sprag wheels 108, 110 are configured to prevent rolling of the sprag wheels 108, 110 relative to the surface of the wellbore 10 in the uphole direction, the interaction of the racks 118, 120 and pinions 116 serves to advance the proximate body 100 towards the distal body 102 thereby compressing the compression spring 106 between the proximate body 100 and the distal body 102.

When the actuator member 104 reaches its fully extended position shown in FIG. 5(b), the compression spring 106 is in its fully compressed state. The relative position sensor 134 transmits a signal to the tractor controller 132 to indicate that the actuator member 104 has reached its fully extended position. The tractor controller 132 transmits an appropriate electrical signal along the tubular metallic member 6c of the line 6 to the surface controller 34 via the sensor element 30 and the cable 38 to indicate that the actuator member 104 has reached its fully extended position. In response to receipt of the electrical signal, the surface controller 34 operates the motor 28 of the winch arrangement 8 so as to reduce tension in the line 6. The surface controller 34 monitors the tension applied to the line 6 via the tension sensor 32 for this purpose. Since the sprag wheels 108, 110 are configured to prevent rolling of the sprag wheels 108, 110 relative to the surface of the wellbore 10 in the uphole direction, the reduction of tension in the line 6 allows the compression spring 106 to drive the distal body 102 in the downhole direction and the arrangement of the racks 118, 120 and pinions 116 serves to retract the actuator member 104 within the proximate and distal bodies 100, 102 until the compression spring 106 reaches its fully extended position and the actuator member 104 is in its fully retracted position once again as shown in FIG. 5(c).

The sequence of movements of the proximate and distal bodies 100, 102 and the actuator member 104 depicted in FIGS. 5(a) to 5(c) results in movement of the tractor 4b by one "step" along the wellbore 10 in the downhole direction. The sequence of movements of the proximate and distal bodies 100, 102 and the actuator member 104 depicted in FIGS. 5(a) to 5(c) is automatically repeated multiple times under the control of the surface controller 34 and the tractor controller 132 to advance the tool arrangement 4 one step at a time in the downhole direction until the surface controller 34 determines that the tool arrangement 4 has reached the desired target position within the horizontal section 16 of the wellbore 10 from readings taken using the tension sensor 32 and the sensor 33 for measuring the length of line 6 hauled in and/or paid out by the winch arrangement 8. It should be understood that the communication of tractor stroke cycle position information as an electrical signal along the tubular metallic member 6c of the line 6 allows the tool arrangement 4 to be automatically advanced downhole to the target position in a highly deviated oil and gas well thereby avoiding any requirement for an operator to manually operate the winch arrangement 8 in a cyclical or alternating fashion to advance the tool arrangement 4 along the horizontal section 16 of the wellbore 10.

During movement of the tool arrangement 4 along the wellbore 10 towards the target position and/or after the tool arrangement 4 has reached the target position, the optical sensing module 40 performs distributed optical sensing measurements in the wellbore 10. Specifically, the optical source (not shown) of the optical sensing module 40 transmits light into the optical fibre 6a of the line 6 and the optical detector (not shown) of the optical sensing module 40 receives light from the optical fibre 6a and the processor (not shown) of the optical sensing module 40 processes the transmitted light and the received light to determine distributed values for one or more parameters relating to the environment in, or adjacent to, the wellbore 10 to which the optical fibre 6a is exposed. The determined distributed values of the one or more environmental parameters are communicated from the optical sensing module 40 to the surface controller 34. Additionally or alternatively, an operator may view the distributed values of the one or more environmental parameters via the display 36.

During movement of the tool arrangement 4 along the wellbore 10 towards the target position and/or after the tool arrangement 4 has reached the target position, the one or more tools of the tool string 4c measure one or more of the properties of the environment in, or adjacent to, the wellbore 10. The one or more measured parameter values are transmitted electrically along the tubular metallic member 6c of the line 6 to the surface controller 34. Additionally, the one or more measured parameter values may be stored in memory within the tool string 4c. The one or more measured parameter values may be displayed to the operator via the display 36 and/or stored in the memory 37 at surface.

The distributed values of the one or more environmental parameters determined from the optical sensing measurement data and, optionally, the one or more values of the properties of the environment in, or adjacent to, the wellbore 10 measured using the one or more tools of the tool string 4c may be used to identify one or more regions of interest of the wellbore 10 at positions uphole from the target position for further investigation or measurements. For example, the surface controller 34 may use the distributed values of the one or more environmental parameters determined from the optical sensing measurement data and, optionally, the one or more values of the properties of the environment in, or adjacent to, the wellbore 10 measured using the one or more tools of the tool string 4c to identify one or more regions of interest of the wellbore 10 at positions uphole from the target position for further investigation or measurements. Additionally or alternatively, the operator may use the distributed values of the one or more environmental parameters determined from the optical sensing measurement data and, optionally, the one or more values of the properties of the environment in, or adjacent to, the wellbore 10 measured using the one or more tools of the tool string 4c to identify one or more regions of interest of the wellbore 10 at positions uphole from the target position for further investigation or measurements by providing a command to the surface controller 34 via the keyboard 35.

Once the one or more regions of interest of the wellbore 10 have been identified, an operator may interface with the surface controller 34 causing it to operate the winch arrangement 8 so as to move the tool arrangement 4 back along the wellbore 10 in the uphole direction towards a first region of interest. The surface controller 34 may simply operate the winch arrangement 8 to haul in the line 6 until the surface controller 34 determines that the tool arrangement 4 has reached the first region of interest from readings taken using the tension sensor 32 and the sensor 33 for measuring the length of line 6 hauled in and/or paid out by the winch arrangement 8 and/or from a position of the tool arrangement 4 as measured by the one or more tools of the tool string 4c of the tool arrangement 4 and transmitted to the surface controller 34 via the tubular metallic member 6c of the line 6.

Alternatively, whilst the tool arrangement 4 is still in the horizontal section 16 of the wellbore 10, the surface controller 34 may operate the winch arrangement 8 to cause the tractor 4b to advance in the uphole direction. Specifically, the surface controller 34 may transmit an appropriate electrical signal along the tubular metallic member 6c of the line 6 to the tractor controller 132. The tractor controller 132 then controls the rotary solenoids 108c, 110c causing the rotary solenoids 108c, 110c to rotate the wheel support members 108d, 110d through 180° about their respective radially aligned axes. In effect, this reverses the direction in which the sprag wheels 108, 110 are permitted to roll relative to the surface of the wellbore 10. The tractor 4b may then be advanced in the uphole direction within the horizontal section 16 of the wellbore 10 using the automated process shown in FIGS. 6(a) to 6(c). As will be apparent to one skilled in the art, the process shown in FIGS. 6(a) to 6(c) is effectively the reverse of the process used to advance the tractor 4b in the downhole direction as described with reference to FIGS. 5(a) to 5(c).

Initially, as shown in FIG. 6(a), the actuator member 104 is initially fully retracted within the proximate and distal bodies 100, 102 and the compression spring 106 is in an extended configuration. On application of tension to the line 6 as shown in FIG. 6(b), the actuator member 104 is withdrawn in the uphole direction. Since the sprag wheels 108, 110 are now configured to prevent rolling of the sprag wheels 108, 110 relative to the surface of the wellbore 10 in the downhole direction, the arrangement of the racks 118, 120 and pinions 116 serves to advance the distal body 102 in the uphole direction towards the proximate body 100 thereby compressing the compression spring 106 between the proximate and distal bodies 100, 102. Release or reduction of the tension in the line 6 permits the compression spring 106 to drive the proximate body 100 away from the distal body 102 in the uphole direction as shown in FIG. 6(c). The sequence of movements of the proximate and distal bodies 100, 102 and the actuator member 104 depicted in FIGS. 6(a) to 6(c) is automatically repeated multiple times under the control of the surface controller 34 and the tractor controller 132 to advance the tool arrangement 4 one step at a time in the uphole direction towards the first region of interest.

If the first region of interest is located in the vertical section 12 of the wellbore 10, the tractor 4b may be used to advance the tool arrangement 4 in the uphole direction along the horizontal section 16 of the wellbore 10 until the tool arrangement 4 reaches the heel 11 of the wellbore 10, whereupon the surface controller 34 may cease reciprocating operation of the winch arrangement 8 and may simply haul in the line 6 until the surface controller 34 determines that the tool arrangement 4 has reached the first region of interest from readings taken using the tension sensor 32 and the sensor 33 for measuring the length of line 6 hauled in and/or paid out by the winch arrangement 8.

Once the tool arrangement 4 reaches the first region of interest, the surface controller 34 sends an electrical signal along the tubular metallic member 6c of the line 6 to the tool arrangement 4 to cause one or more tools of the tool string 4c to perform a measurement of one or more parameters relating to the environment in, or adjacent to, the wellbore 10 in the first region of interest. The one or more measured parameter values are transmitted electrically along the tubular metallic member 6c of the line 6 to the surface controller 34. Additionally, the one or more measured parameter values may be stored in memory within the tool string 4c. The one or more measured parameter values may be displayed to the operator via the display 36 or for storage in the memory 37. Optionally, once the tool arrangement 4 reaches the first region of interest, the optical sensing module 40 may make one or more additional distributed optical sensing measurements.

Once the one or more tools of the tool string 4c have completed the measurements of the one or more parameters relating to the environment in, or adjacent to, the wellbore 10 in the first region of interest and, optionally, the optical sensing module 40 has made one or more additional distributed optical sensing measurements when the tool arrangement 4 is located in the first region of interest, the one or more tools of the tool string 4c send an electrical signal along the tubular metallic member 6c of the line 6 to the surface controller 34 to confirm the same. The surface controller 34 (or the operator) may then operate the winch arrangement 8 so as to advance the tool arrangement 4 in the uphole direction towards a further region of interest and the process may be repeated until measurements have been completed in all of the regions of interest.

When measurements are complete in all of the regions of interest, the surface controller 34 (or the operator) may then operate the winch arrangement 8 so as to pull the tool arrangement out of the wellbore 10. Specifically, in order to remove the tool arrangement 4 from the wellbore 10, an operator may interface with the surface controller 34 causing it to transmit an appropriate electrical signal along the tubular metallic member 6c of the line 6 to the tractor controller 132. The tractor controller 132 checks to determine whether sprag wheels 108, 110 are configured to permit rolling in the uphole direction. If the sprag wheels 108, 110 are configured to prevent rolling in the uphole direction, the tractor controller 132 then controls the rotary solenoids 108c, 110c causing the rotary solenoids 108c, 110c to rotate the wheel support members 108d, 110d through 180° about their respective radially aligned axes. In effect, this reverses the direction in which the sprag wheels 108, 110 are permitted to roll relative to the surface of the wellbore 10 so that the winch arrangement 8 may pull the tool arrangement 4 in the uphole direction via the line 6.

In light of the foregoing, it will be apparent that the system 2 facilitates the deployment of the line 6 including the optical sensing fibre 6a and the tubular metallic member 6c into the wellbore 10 to permit an initial distributed optical sensing survey of the wellbore 10 to be performed using the optical sensing fibre 6a. Industry-standard logging tools of the tool string 4c may be used to monitor the position of the tool string 4c. The surface controller 34 may use the measured position of the tool string 4c to ensure arrival of the tool string 4c at the target position so that a distal end of the optical fibre 6a is located at the correct position in the wellbore 10 for the distributed optical sensing survey of the wellbore 10. The system 2 also facilitates a more "in-depth" analysis based on measurements performed with the industry-standard logging tools in one or more regions of interest on the way back to surface 14.

Figure 7:
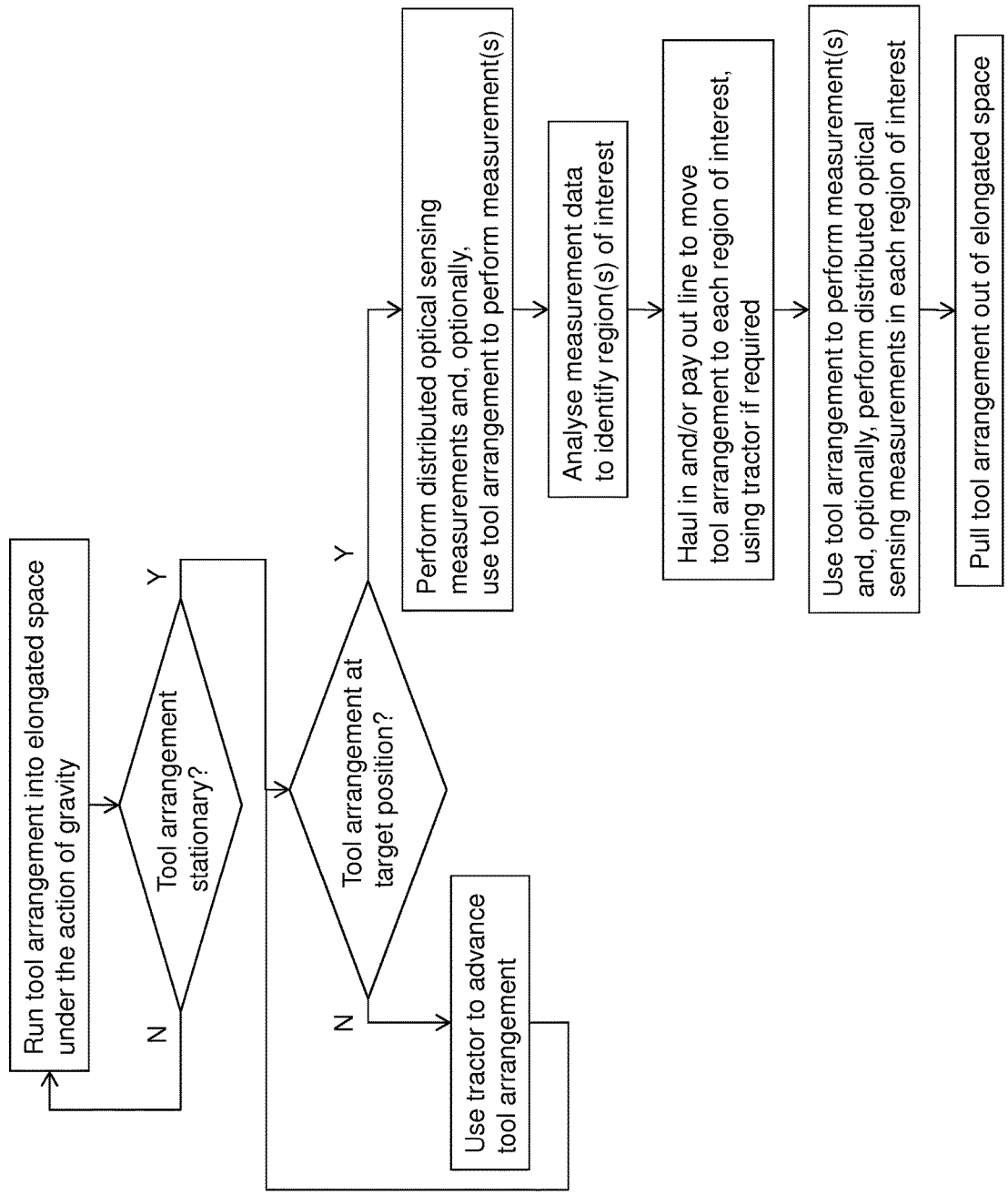
FIG. 7 is a flow chart illustrating a method of use of the system of FIG. 1.

From the foregoing description, one of ordinary skill in the art will recognise that the system 2 of FIG. 1 may be used to perform an operation in, or adjacent to, the initial vertical section 12 of the wellbore 10 (or any vertically oriented elongated space such as a vertical wellbore) without any need to operate the tractor 4b. Thus, as shown in FIG. 7, the method of use of the system 2 may depend on whether the tool arrangement 4 can reach the target position in the elongated space under the action of gravity without operation of the tractor 4b, or whether the tool arrangement 4 requires operation of the tractor 4b to reach the target position.

One of ordinary skill in the art will appreciate that the foregoing methods are enabled by performing distributed optical sensing techniques using the optical fibre 6a of the line 6 and by communicating electrical signals along the tubular metallic member 6c of the line 6.

The line 6 may have an outer profile of a slickline. For example, the line 6 may have the same outer diameter of an industry-standard slickline. The line 6 may have a smooth outer surface against which well pressure sealing may be simply and safely performed by industry-standard stuffing box sealing glands.

The foregoing methods may allow one or more regions of interest of the wellbore 10 to be identified from analysis of distributed optical sensing measurement data and the tool arrangement 4 to be moved to each of the regions of interest in an efficient automated manner to permit further measurements of the environment in, or adjacent to, the wellbore 10 to be made in each of the regions of interest using one or more sensors of the tool string 4c without any requirement for the tool arrangement 4 to be removed from the wellbore 10. For example, a preliminary analysis of DAS data may be performed in a period of 1 to 2 hours. If the preliminary analysis shows an acoustic hotspot in a localised region of the wellbore 10, this may be indicative of a gas leak in the region concerned. Under these circumstances, the foregoing methods may be used to move the tool arrangement 4 efficiently to the acoustic hotspot to allow further measurements to be performed using the one or more sensors of the tool string 4c without any requirement to remove the tool arrangement 4 from the wellbore 10. Such methods may dramatically reduce the time to log the wellbore 10 by reducing the number of well interventions. Such methods may, for example, save days or weeks in some cases. Such methods may also substantially reduce the associated well servicing and/or production costs.

One of ordinary skill in the art will also appreciate that the foregoing methods may allow the optical sensing fibre 6a to be deployed in a deviated wellbore 10 in an efficient automated manner using the mechanically-powered tractor 4b without any requirement for an operator to manually operate the winch arrangement 8 to reciprocate the line 6 and without any requirement to transmit electrical power along the line 6.

One of ordinary skill in the art will appreciate that modifications of the foregoing embodiments and methods are possible without departing from the scope of the present invention. For example, the motor 28 used to drive the drum 26 of the winch arrangement 8 may be an internal combustion engine or may be electrical or hydraulic. The winch arrangement 8 may include a caterpillar haul-off and a separate drum or reel for storing the line 6. The separate drum or reel for storing the line 6 may be non-driven or may be driven by a motor to take up slack.

Instead of the optical sensing module 40 rotating with the drum 26, the sensing module 40 may only be optically coupled to the proximate end of the optical fibre 6a when the drum 26 is stationary so as to permit distributed optical sensing measurements to be performed and the sensing module 40 may be optically decoupled from the proximate end of the optical fibre 6a to permit rotation of the drum 26 relative to the optical sensing module 40. In a further alternative arrangement, the optical sensing module 40 may not rotate with the drum 26 but the optical sensing module 40 may be optically coupled to the proximate end of the optical fibre 6a using a rotary optical coupler to provide a continuous optical connection between the optical sensing module 40 and the proximate end of the optical fibre 6a whilst still permitting rotation of the drum 26 relative to the optical sensing module 40.

Additionally or alternatively, the tractor 4b may include linear actuators (not shown) for radially extending/retracting the wheel support members 108d, 110d away from/towards the corresponding bodies 100, 102. An operator may operate the surface controller 34 to transmit an electrical signal along the tubular metallic member 6c of the line 6 to the tractor controller 132 which in turn controls the linear actuators to cause the wheel support members 108d, 110d to be radially extended/retracted away from/towards the corresponding bodies 100, 102 thereby causing the corresponding sprag wheels 108, 110 to engage/disengage the surface of the wellbore 10. For example, the sprag wheels 108, 110 may be radially retracted during deployment or retrieval of the tool arrangement 4 into/from the vertical section 12 of the wellbore 10 and the sprag wheels 108, 110 may be radially extended during reciprocating operation of the tractor 4b according to the inchworm principle for step-wise movement of the tool arrangement 4 along the horizontal section 16 of the wellbore 10.

Since the battery 136 is not required to provide power for driving the mechanically-powered tractor 4b, the battery capacity and size problems associated with conventional battery-driven tractors may be avoided. Moreover, battery status information may be communicated as an electrical signal along the tubular metallic member 6c of the line 6 from the tractor controller 132 to the surface controller 34. For example, the tractor controller 132 may communicate the quantity of electrical energy stored in the battery 136 and/or a rate of consumption of electrical energy stored in the battery 136 to the surface controller 34 as an electrical signal along the electrically conductive member 6c of the line 6. The surface controller 34 may be configured to operate the winch arrangement 8 according to the battery status information. For example, the surface controller 34 may be configured to curtail or cease further operation of the winch arrangement 8 or to control the winch arrangement 8 so as to pull the tool arrangement 4 out of the wellbore 10 according to the battery status information. Additionally or alternatively, an operator may interface with the surface controller 34 causing it to operate the winch arrangement 8 so as to curtail or cease further operation of the tractor 4b or so as to pull the tool arrangement 4 out of the wellbore 10 in response to the battery status information. In addition, line tension sensed by the tractor line tension sensor 130 may be communicated as an electrical signal along the tubular metallic member 6c of the line 6 from the tractor controller 132 to the surface controller 34. The surface controller 34 may be configured to operate the winch arrangement 8 according to the sensed tension in the line 6 adjacent to or in the vicinity of the tool arrangement 4. For example, the surface controller 34 may be configured to curtail or cease further operation of the winch arrangement 8 or to control the winch arrangement 8 so as to pull the tool arrangement 4 out of the wellbore 10 according to the sensed tension in the line 6 adjacent to or in the vicinity of the tool arrangement 4. Additionally or alternatively, an operator may interface with the surface controller 34 causing it to operate the winch arrangement 8 so as to curtail or cease further operation of the tractor 4b or so as to pull the tool arrangement 4 out of the wellbore 10 in response to the sensed tension in the line 6 adjacent to or in the vicinity of the tool arrangement 4.

The foregoing methods may be used with any reciprocating tractor which operates according to an inchworm principle. For example, the foregoing methods may be used with a reciprocating tractor in which the sprag wheels 108, 110 are replaced by gripping members such as drag blocks which may be radially extended and radially retracted in an alternating sequence according to the inchworm principle.

Alternatively, rather than using a mechanically-powered tractor, a battery-powered conventional tractor may be used. In either case, the tractor may be used to propel the tool arrangement 4 along the wellbore 10 in response to information transmitted electrically along the tubular metallic member 6c of the line 6.

The line 6 may have an alternative configuration to that described with reference to FIG. 2A. For example, FIG. 2B shows a first alternative line 206 which includes an optical fibre 206a, embedded in gel 206b which is contained within an electrically conductive member in the form of a tubular metallic member 206c. The line 206 further includes a layer of composite material 206e around the tubular metallic member 206c. The layer of composite material 206e may include one or more reinforcing elements embedded in a matrix material such as a polymer material. The polymer material may include at least one of PEEK, PEKK, PAEK and PEI. The line 206 may include a second electrically conductive member (not shown) surrounding the layer of composite material 206e. The line 206 may further include an electrically insulating, abrasion- and corrosion-resistant outer coating or layer 206d which may be formed from or include a polymer material selected from at least one of PEEK, PEKK, PAEK, PEI, PES and LCP.

The line 206 may have the outer profile of a slickline. Specifically, the line 206 may have an outer diameter selected from the outer diameters of an industry standard slickline. For example, the line 206 may have an outer diameter of 0.092", 0.108", 0.125", 0.140", 0.150", 0.160" or 0.20". The line 206 may have an outer diameter of 2 to 15 mm, 3 to 10 mm or 4 to 8 mm. The line 206 may be capable of supporting a tensile load of 200 to 2,500 kg, 300 to 1,800 kg or 400 to 1,250 kg.

FIG. 2C shows a second alternative line 306 which includes an optical fibre 306a, embedded in gel 306b which is contained within an electrically insulating member in the form of an electrically insulating tubular member 306c. The tubular member may comprise or be formed from an electrically insulating material such as an electrically insulating material polymer material. The polymer material may comprise at least one of PEEK, PEKK, PAEK and PEI. The line 306 further includes an electrically conductive member or layer 306f located on or around the electrically insulating tubular member 306c. The electrically conductive member or layer 306f may comprise an electrically conductive coating, a sheathing layer or a braid located on or around an outer surface of the electrically insulating tubular member 306c.

The line 306 further includes a layer of composite material 306e around the electrically conductive member or layer 306f. The layer of composite material 306e may include one or more reinforcing elements embedded in a matrix material such as a polymer material. The polymer material may include at least one of PEEK, PEKK, PAEK and PEI. The line 306 may further include an electrically insulating, abrasion- and corrosion-resistant outer coating or layer 306d which may be formed from or include a polymer material selected from at least one of PEEK, PEKK, PAEK, PEI, PES and LCP.

The line 306 may have the outer profile of a slickline. Specifically, the line 306 may have an outer diameter selected from the outer diameters of an industry standard slickline. For example, the line 306 may have an outer diameter of 0.092", 0.108", 0.125", 0.140", 0.150", 0.160" or 0.20". The line 306 may have an outer diameter of 2 to 15 mm, 3 to 10 mm or 4 to 8 mm. The line 306 may be capable of supporting a tensile load of 200 to 2,500 kg, 300 to 1,800 kg or 400 to 1,250 kg.

What is claimed is:

1. A system for surveying or logging an elongated space, the system comprising:
    a tool arrangement comprising one or more tools for measuring a property of an environment in, or adjacent to, the elongated space;
    a line including an optical fibre for distributed optical sensing measurements, an electrically insulating material, and an electrically conductive member covered by the electrically insulating material, and the line having the outer profile of a slickline;
    a termination-coupler which mechanically connects the line to the tool arrangement, which electrically connects the electrically conductive member of the line to the tool arrangement, and which comprises a termination housing defining a sealed chamber containing a distal end of the optical fibre so that the termination-coupler optically terminates the optical fibre without optically coupling the optical fibre to the one or more tools;
    a winch arrangement for hauling in and/or paying out the line;
    an optical sensing module configured to perform distributed optical sensing measurements using the optical fibre; and
    a controller configured to:
        cause the optical sensing module to perform an initial distributed optical sensing survey of the elongated space using the optical fibre, wherein performing the initial distributed optical sensing survey of the elongated space using the optical fibre comprises performing distributed optical sensing measurements in the elongated space using the optical fibre;
        identify one or more regions of interest of the elongated space for further investigation based at least in part on results of the distributed optical sensing measurements of the initial distributed optical sensing survey;
        control the winch arrangement to haul in and/or pay out the line so as to cause or allow the tool arrangement to move along the elongated space to each region of interest identified based on said results of the distributed optical sensing measurements of the initial distributed optical sensing survey; and
        electrically transmit information along the electrically conductive member of the line so as to cause the tool arrangement to conduct said further investigation comprising measuring the property of the environment in, or adjacent to, the elongated space in each region of interest identified based on said results of the distributed optical sensing measurements of the initial distributed optical sensing survey.

2. A system according to claim 1, wherein the tool arrangement comprises a tractor which is configured to propel the tool arrangement along the elongated space in response to information transmitted electrically along the electrically conductive member of the line and, optionally,
    wherein the tractor comprises a mechanically-powered tractor which is configured to operate according to a reciprocating inchworm principle, or
    wherein the tractor comprises a battery-powered tractor.

3. A system according to claim 1,
    wherein the distal end of the optical fibre is configured to reflect at least a portion of incident light transmitted along the optical fibre in a first direction back along the optical fibre in a second direction opposite to the first direction and/or the distal end of the optical fibre is polished, cleaved or otherwise terminated to reflect at least a portion of the incident light, or
    wherein the termination-coupler comprises a reflector optically coupled to the distal end of the optical fibre so as to reflect at least a portion of incident light transmitted along the optical fibre in a first direction back along the optical fibre in a second direction opposite to the first direction.

4. A system according to claim 1, wherein the line has an outer diameter of 0.092", 0.108", 0.125", 0.140", 0.150", 0.160" or 0.20" or wherein the line has an outer diameter of 2 to 15 mm, 3 to 10 mm or 4 to 8 mm and, optionally,
    wherein the line is capable of supporting a tensile load of 200 to 2,500 kg, 300 to 1,800 kg or 400 to 1,250 kg.

5. A system according to claim 1, wherein at least one of:
    the line comprises a tubular member and the optical fibre is contained within the tubular member; and
    the line comprises gel within the tubular member and the optical fibre is embedded within the gel.

6. A system according to claim 5, wherein at least one of:
    the tubular member comprises or is formed from an electrically conductive material so as to define the electrically conductive member; and
    the tubular member comprises or is formed from one or more metals.

7. A system according to claim 5, wherein at least one of:
    the electrically conductive member is located outside the tubular member;
    the electrically conductive member comprises an electrically conductive coating, an electrically conductive sheathing layer or an electrically conductive braid located on or around an outer surface of the tubular member;
    the tubular member comprises or is formed from an electrically insulating material;
    the tubular member comprises or is formed from a polymer material; and
    the polymer material comprises at least one of polyether ether ketone (PEEK), polyetherketoneketone (PEKK), polyaryletherketone (PAEK) and polyethylenimine (PEI).

8. A system according to claim 5, wherein at least one of:
    the line comprises a composite material located on or around the tubular member;
    the composite material is electrically insulating;
    the electrically conductive member is embedded in, or covered by, the composite material;
    the composite material comprises one or more reinforcing elements embedded in a matrix material such as a polymer material;
    the one or more of the reinforcing elements comprise at least one of a glass, basalt, carbon, graphene, PBO and a ceramic material;
    the one or more of the reinforcing elements are of a short type, a long type or a continuous type; and the polymer material comprises at least one of polyether ether ketone (PEEK), polyetherketoneketone (PEKK), polyaryletherketone (PAEK) and polyethylenimine (PEI).

9. A system according to claim 5, wherein at least one of:
the line comprises a composite material located on or around the tubular member;
the composite material is electrically conductive;
the composite material comprises one or more electrically conductive reinforcing elements embedded in an electrically insulating matrix material such as an electrically insulating polymer material;
each of the one or more electrically conductive reinforcing elements comprise a metal;
the polymer material comprises at least one of polyether ether ketone (PEEK), polyetherketoneketone (PEKK), polyaryletherketone (PAEK) and polyethylenimine (PEI); and
the composite material defines the electrically conductive member.

10. A system according to claim 1, wherein at least one of:
the line comprises an electrically insulating outer coating such as a polymer outer coating;
the outer coating is resistant to abrasion and/or corrosion; and
the outer coating comprises at least one of polyether ether ketone (PEEK), polyetherketoneketone (PEKK), polyaryletherketone (PAEK) and polyethylenimine (PEI), polyether sulfone (PES) and a liquid-crystal polymer (LCP).

11. A system according to claim 1, wherein the elongated space is defined at least partially within or adjacent to at least one of a borehole, a wellbore, an oil or gas well, tubing, casing, a pipe, and a pipeline.

12. A method of surveying or logging an elongated space, the method comprising:
deploying a tool arrangement into the elongated space using a line coupled to the tool arrangement, the tool arrangement comprising one or more tools for measuring a property of an environment in, or adjacent to, the elongated space, the line being coupled to the tool arrangement, the line including an optical fibre for distributed optical sensing measurements, an electrically insulating material, and an electrically conductive member covered by the electrically insulating material, the line having the outer profile of a slickline, and the line being coupled to the tool arrangement via a termination-coupler which mechanically connects the line to the tool arrangement, which electrically connects the electrically conductive member of the line to the tool arrangement, and which comprises a termination housing defining a sealed chamber containing a distal end of the optical fibre so that the termination-coupler optically terminates the optical fibre without optically coupling the optical fibre to the one or more tools;
using the optical fibre to perform an initial survey of the elongated space, the initial survey comprising distributed optical sensing measurements;
identifying one or more regions of interest of the elongated space for further investigation based at least in part on results of the distributed optical sensing measurements of the initial survey;
hauling in and/or paying out the line so as to cause or allow the tool arrangement to move along the elongated space to each region of interest identified based on the results of the distributed optical sensing measurements of the initial survey; and
electrically transmitting information along the electrically conductive member of the line so as to cause the tool arrangement to conduct the further investigation comprising measuring one or more values of the property of the environment in, or adjacent to, the elongated space in each region of interest identified based on the results of the distributed optical sensing measurements of the initial survey.

13. A method according to claim 12, wherein the distributed optical sensing measurements comprise at least one of distributed temperature, distributed pressure, distributed strain, and distributed acoustic sensing measurements, and/or
wherein the tool arrangement is configured to measure the one or more values of the property of the environment in, or adjacent to, the elongated space using a measurement technique other than the measurement technique used for the distributed optical sensing measurements.

14. A method according to claim 12, comprising electrically transmitting data along the electrically conductive member of the line, which data is representative of a measured value of the property of the environment in, or adjacent to, the elongated space.

15. A method according to claim 12, wherein the tool arrangement comprises a tractor, and wherein the method comprises, electrically transmitting information along the electrically conductive member of the line so as to cause the tractor to propel the tool arrangement along the elongated space.

16. A method according to claim 15, wherein the tractor comprises a mechanically-powered tractor which is configured to operate according to a reciprocating inchworm principle, and wherein the method comprises;
transmitting a stroke cycle position of the tractor as an electrical signal along the electrically conductive member of the line; and
reciprocating the line according to the stroke cycle position of the tractor so as to cause the tractor to propel the tool arrangement along the elongated space and, optionally,
wherein the method comprises reciprocating the line according to the stroke cycle position of the tractor so as to cause the tractor to propel the tool arrangement to a target position and/or to each region of interest.

17. A method according to claim 15, wherein the tractor comprises a battery-powered tractor, and wherein the method comprises electrically transmitting information along the electrically conductive member of the line so as to cause the tractor to propel the tool arrangement along the elongated space.

18. A method according to claim 12, comprising measuring a property of the tool arrangement and electrically transmitting data representative of the measured property of the tool arrangement along the electrically conductive member of the line and, optionally, wherein the measured property of the tool arrangement comprises at least one of:
a position, velocity and/or acceleration of the tool arrangement;
relative positions of one or more parts of the tool arrangement;
a power level of a battery of the tool arrangement; and
a rate of consumption of power stored in a battery of the tool arrangement.

19. A method according to claim 12, comprising measuring a property of line, for example tension, in the elongated space and electrically transmitting data representative of the measured property of the line along the electrically conductive member of the line.

20. A method according to claim 12, wherein the elongated space is defined at least partially within or adjacent to at least one of a borehole, a wellbore, an oil or gas well, tubing, casing, a pipe, and a pipeline.

* * * * *